Figure 1:
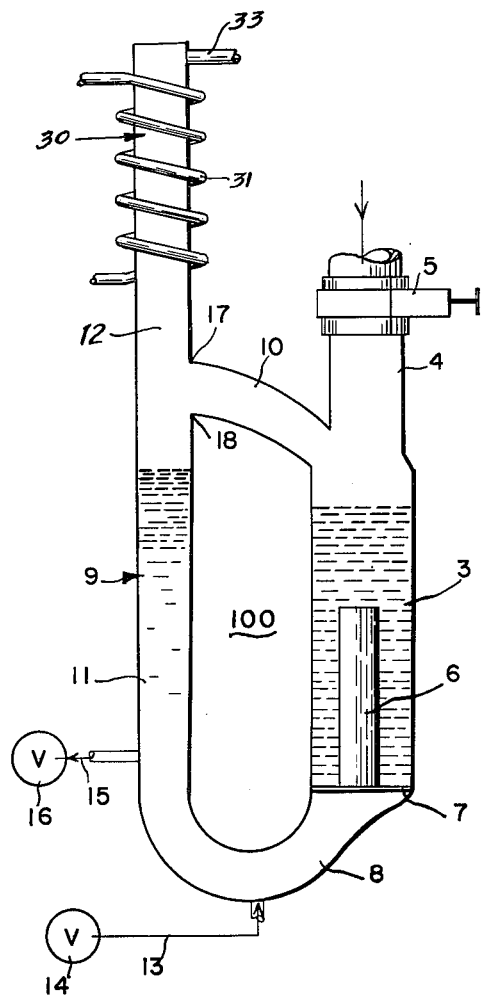

May 15, 1962  E. E. ERICKSON  3,034,868
CONTINUOUS TREATMENT APPARATUS
Filed Feb. 14, 1961

INVENTOR.
EUGENE E. ERICKSON
BY

ATTORNEY

United States Patent Office 3,034,868
Patented May 15, 1962

3,034,868
CONTINUOUS TREATMENT APPARATUS
Eugene E. Erickson, Idaho Falls, Idaho, assignor to the United States of America as represented by the United States Atomic Energy Commission
Filed Feb. 14, 1961, Ser. No. 89,324
3 Claims. (Cl. 23—267)

The invention relates to a novel apparatus and method for treating masses of material continuously, more particularly to an apparatus and method for processing radioactive fuel elements from nuclear reactors in a continuous manner.

It has now become recognized that if nuclear reactors are to be operated economically the "spent" fuel elements must be reprocessed to recover the unused fuel values remaining therein. This is due to the fact that reactor fuel elements become unusable not because of the actual depletion of the actinide isotopes through fission by the neutrons, but because the fission of only a minor portion of the fissionable material is enough to cause an accumulation of fission products with large neutron absorption cross-sections which reduce, or "poison," the neutron flux to where the nuclear reaction can proceed no further. The major portion of the fissionable material is therefore still intact when the fuel element becomes unusable, and because of the high cost of uranium and other fissionable material the salvage of this major portion is an economic necessity. Another object of fuel reprocessing is to separate out the fission products having economic value for use in thickness testing, atom "tagging," and the numerous other purposes which have been found for radioactive isotopes.

A number of systems of fuel reprocessing are known but the most widely used by far are the "wet" methods, which begin by the dissolution of the spent fuel elements, usually, but not necessarily including the metal jackets or "cans," in some aqueous solvent such as nitric and hydrochloric acids. This is done both with metallic fuel elements and fuel elements of the ceramic or oxide type, such as compressed uranium dioxide, and also with "mixed" fuel elements such as cermets and dispersions of ceramics and metals together, the type and strength of the solvent being adjusted, of course, to meet the particular conditions. In any case, the resulting solution is then treated in various ways, by selective precipitation, solvent extraction, ion exchange, or a combination of these to separate the fuel values and the economically valuable fission products. Regardless of the scheme of reprocessing or the type of fuel elements involved, my invention will be applicable as an aid to the initial dissolution of the fuel elements.

In an ordinary operation when a solid is to be treated in a continuous process it is ground up, or comminuted in some way, so that it may be fed into the processing system at a steady rate, but this is generally too complicated and dangerous for radioactive fuel elements, and they usually are put into the acid solvent whole, or at most, as relatively large, discrete segments either one at a time, or at least in limited numbers. In the usual vertical tube dissolver, there results a spasmodic kind of chemical reaction which starts off vigorously and soon generates heat in such large quantities that the water, and often the acid as well, are converted to vapor which expels much, even up to four-fifths, of the liquid solvent out of the reaction part of the vessel in violent "surges." This slows down the reaction by reducing the amount of immersion of the fuel element in the solvent, and this reduction often continues for a considerable period of time as the vapor creating the surge follows the liquid solvent up into the reflux condenser and acts as a kind of plug to slow its escape back into the reaction vessel. "Trickle" type dissolvers have been devised in an attempt to meet this situation, but these tend to be somewhat unstable, are less efficient than desirable, and may require return of product to the dissolver for further acid utilization. Mechanical stirring, of course, is not feasible in a column containing relatively large metal objects, and in any case would involve more equipment and manipulation.

It is, accordingly, an object of the invention to provide a method and apparatus whereby masses of material such as metals, ceramics, cermets and dispersions may be dissolved in solvents in a continuous or semicontinuous manner without comminuting them in advance, and yet carrying out the dissolution within a predictable time.

It is more particularly an object of the invention to provide a method and apparatus whereby nuclear reactor fuel elements may be dissolved in a continuous or semicontinuous manner.

It is a more particular object to provide a method and apparatus to supply a uniform feed solution of constant composition of dissolved nuclear reactor fuel elements to a reprocessing system.

It is a further object of the invention to provide a dissolver apparatus particularly adapted for processing large uncut fuel elements of irregular shape; for two-step dissolutions in which the cladding and the fissionable "meat" must be dissolved by different solvent systems; or for dissolutions in which the "meat" is dissolved from inside the cladding of cut elements after which the cladding is mechanically removed from the dissolver for separate disposal as solid waste.

A specific object of the invention is to provide a compact dissolver providing a high degree of contacting efficiency, smooth operation, constant product composition, controllability, and versatility in that it can be operated in a continuous or semicontinuous manner.

All the foregoing objects are attained by my discovery that the spasmodic nature of the dissolution of a mass such as a fuel element in a solvent such as an aqueous acid is mainly, if not entirely, due to the formation over the surface of the mass of a layer of gas bubbles of water vapor and the other gases generated by the chemical reaction such as the oxides of nitrogen in the case of nitric, hydrogen in the case of other acids, and the like, and that the surges of vapor may be eliminated and the reaction made steady by a device actuated by the energy of the vapor which entrains the solvent and circulates it continuously around the mass and out of the reaction vessel after which the vapor itself is led into a condenser, from which it is returned to the reaction vessel, at a place which will reinforce the scheme of circulation rather than to oppose it, as in a conventional reflux condenser return.

Figure 2:
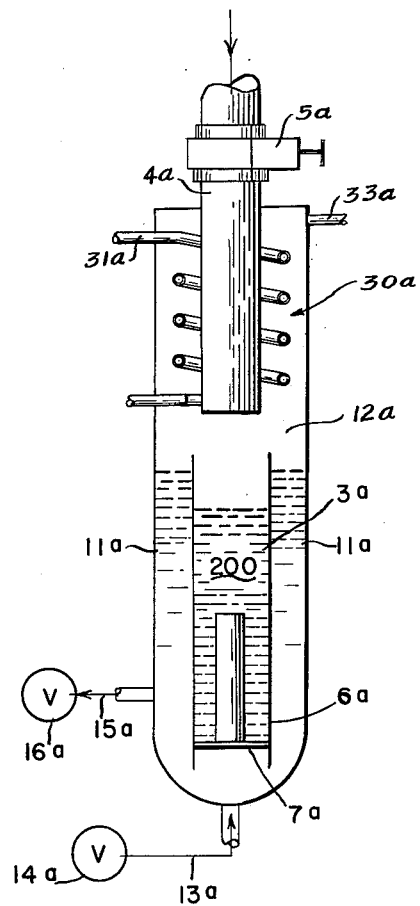

Attention is now directed to the drawings in which FIGURES 1 and 2 are schematic representations of two embodiments of the invention. FIGURE 1 shows what can be called the external loop type of embodiment, and FIGURE 2 what can be called the coaxial or jacketed type. The coaxial type is usually to be preferred because it conserves heat and operates more smoothly, and may be more economical to operate, but since the invention is more easily understood for the external loop type this will be discussed first.

In FIGURE 1 the dissolver, indicated generally at 100, consists of reaction vessel 3 which has a charging chute 4 through which fuel elements or "slugs" can enter from a hopper (not shown) through gate device 5. The drawing shows an element or "slug" 6 in the reaction vessel 3 resting on the perforated bottom 7, but it will be understood that more than one slug can be dissolved at a time, cut segments of slugs, or cores with the cladding removed. (Hereinafter the element 6 will be referred to as slug 6 for the sake of brevity, and will be taken to include fuel elements, or segments thereof, of all types whether ordinarily called "slugs" or not.) Beneath reaction vessel 3 is the bottom turn 8 of the external loop, indicated generally at 9, the other parts of the loop being top turn 10, left straightaway portion 11, and, of course, reaction vessel 3 furnishes the other straightaway of the complete loop. Condenser exit 12, located near the junction of top turn 10 and straightaway 11 leads to a condenser 30. Fresh solvent line 13 introduces fresh solvent continuously or from time to time into the dissolver 100 as controlled by valve 14 or a pump, (not shown) and product line 15 withdraws portions of the solution circulating in the dissolver continuously or at other times, as controlled by valve 16, or by a constant head overflow device (not shown).

To operate the dissolver, gate device 5 is opened to permit fuel slug(s) 6 to fall into the reaction vessel 3, and closed before further elements can leave the hopper. It is understood thta perforated bottom 7 may be padded with glass wool or the like to cushion the impact of the slug, or reaction vessel 3 may be previously filled with liquid for the same purpose. At the start-up of the dissolver 100 fresh solvent is introduced from fresh solvent line 13 to partially cover the top of slug 6. The chemical reaction between slug 6 and the solvent such as aqueous nitric or hydrochloric acid will begin immediately or after heating to initiate the reaction, generating heat which will convert a part of the solvent to vapor. Of course, for an endothermic reaction heating must be continued. The vapor consisting of water vapor and gases such as the oxides of nitrogen will rise into top turn 10 entraining large amounts of solvent in the liquid state. The vapor will rise further into condenser exit 12 and up into the condenser 30 in which the water vapor will condense to water in which some of the oxides of nitrogen will dissolve and reform nitric acid, and the rest of the gases such as the oxides of nitrogen being vented out of the system by vent pipe 33. It will be noted that the angle 17 between top turn 10 and condenser exit 12 is preferably obtuse whereas the angle 18 between top turn 10 and straightaway 11 is preferably acute; this will allow the vapor to go into condenser exit 12 more easily and as this happens a large, if not a major, portion of the solvent entrained by the vapor will be stripped from it and fall into straightaway 11. This liquid transfer, together with the trickle of condensate liquid down from the condenser along the sides of condenser exit 12 into straightaway 11, will cause a strong counter-clockwise circulation of liquid in the dissolver 100, whereby the slug 6 is continuously bathed in a flow of liquid which sweeps away the bubbles as they form on its surface and prevents the buildup of a substantial bubble layer, thereby both avoiding the insuling effect of such a layer and forestalling the "surges" of vapor which are due to the sudden escape of large bubbles formed when the small bubbles on the surface of the mass unite. Furthermore, it will be noted that the density of the liquid in straightaway 11 will be greater than that of the liquid in vessel 3 due to its smaller gas content; this will enhance the circulation above mentioned. It can be seen that my invention turns to good account the energy of the vapor which had been the cause of trouble in prior continuous dissolvers, and makes it the means of actuating the scheme of circulation. After the dissolver is started it attains before too long a time a virtually steady state which can be maintained by adjusting valves 14 and 16 at the proper time; the makeup of the solution being circulated can thus be made constant or nearly so. It will be understood that this can be done either manually or automatically as is well known in the art; one method of making the process automatic is to locate product outlet line 15 at the top level of the solvent desired, and permit it to overflow at a rate determined mainly by the solvent feed rate. The condenser 30 is provided with cooling coil 31. The entire dissolver 100 may be cooled by cooling coil, water jacketing and the like; a heating coil may be added to hasten the reaction on start-up if this is deemed necessary, or to provide heat for an endothermic reaction.

Referring now to FIGURE 2 the dissolver represented generally at 200 is essentially like the dissolver 100 in FIGURE 1 except that instead of having an external loop with a straightaway 11, it has a coaxial arrangement with reaction vessel 3a surrounded by cylindrical straightaway 11a. The condenser exit 12a is coaxial and performs the function of condenser exit 12, and feed line 13a and product withdrawal line 15a correspond to, and perform the same functions as, feed line 13 and product withdrawal line 15. The functioning of the two embodiments is essentially the same in all respects.

In the operation of either of the types of dissolver described the time required will, of course, vary with the individual fuel elements, whether of the metallic, oxide, cermet, dispersion or other type, whether the cladding metal has been removed or not, whether they have been cut or not, and the degree to which burnup has proceeded.

While the dissolver of the invention is primarily designed for continuous and semicontinuous operation, it can also be operated batchwise simply by closing the inlet valves 14 or 14a and the outlet valves 16 or 16a, as the case may be, and allowing a batch of fuel and a predetermined amount of solvent to react to completion. This method may be particularly advantageous when a given dissolver is used for a relatively small fuel load, or when the removal of cladding only is desired. Ordinarily, however, continuous or semicontinuous operation is preferable. In continuous operation, fresh fuel elements are admitted to the dissolver before dissolution of those previously admitted is complete. By semicontinuous operation is meant the continuous flow of solvent into and product out of the dissolver over a period required to dissolve a single "batch" of fuel elements. Such operation is particularly advantageous for the processing of large uncut elements of irregular shape, for two-step dissolutions in which the cladding and meat must be dissolved by different solvent systems, and for dissolutions in which the meat is dissolved from inside the cladding of cut elements after which the cladding of cut elements after which the cladding is mechanically removed from the dissolver for separate disposal as solid waste. Such processes are normally carried out batchwise, where the size of the dissolver is dictated by the total volume of dissolvent. The dissolver of the invention, operated semicontinuously, allows the use of much smaller equipment, the size of the dissolver being established by the size and shape of the fuel elements rather than by volume of solvent required.

*Example*

In a reprocessing plant for fuel elements a coaxial type dissolver is built along the general lines of the dissolver shown in FIGURE 2, but with a number of modifications to meet practical operating problems which in no way involve a change of the underlying principles of the invention.

The condenser and the charging chute are made coaxial as shown in FIGURE 2, the charging chute being the inside tube of smaller diameter and the condenser the outside annular space between the coaxial tubes. A cable on a winch, with a holding clamp at the lower end, is added to the hopper to lower the fuel elements down through the chute, rather than to let them fall by gravity. A spray ring is added near the bottom of the chute for washing down the dissolver and the cable and clamp. The dissolver is shielded over-all to protect personnel from radioactivity. But as none of these minor modifications are part of the invention, no more detailed description will be given here.

The dissolver is constructed for the most part of stainless steel which is a suitable material when the solvent to be handled is aqueous nitric acid; for hydrochloric acid and certain other solvents, ceramics or steel coated with ceramics may be required, but again, the choice of particular construction materials is not germane to the invention which is operable regardless of what is used.

An electrical heating coil is placed around the reaction vessel to reduce heat loss and a steam coil is placed in the bottom of the dissolver to hasten the chemical reaction of dissolution on start-up, and the condenser consists of many turns of a cooling coil carrying water, as is known in the art.

The feed line into the disssolver is supplied by two pumps to hasten the flow of acid into the dissolver; when both pumps are working at maximum capacity the feed can be introduced at a rate of 165 milliliters per minute; in actual semicontinuous operation the rate of introduction varies from about 15 to about 160 milliliters per minute, depending on the rate of dissolution and product composition desired. To allow for the acid consumption in the reaction, it is essential that the acid fed into the dissolver be rather strong, several times stronger than the acidity of the product of the dissolver (or feed into the plant from the dissolver); various strengths were tried and 5 M $HNO_3$ was found to be the preferred feed into the dissolver. This is preheated outside the dissolver to near the boiling point.

The fuel elements are of the aluminum-uranium alloy type clad in substantially pure aluminum.

A sampling system is attached to the dissolver having a sample withdrawal line taking off from the dissolver nearer its bottom under the perforated holding plate and an air lift pump to pump the sample into an automated sampler. The electrical signal from the sampler controls the valve in the feed line as well as the heating coil, as is well known in the art. A thermocouple is placed in outer straightaway portion of the dissolver and connects to an electrical relay and the signal from the latter is connected to the control system of the sampler in such a way as to shut off the feed and the heating coil if the temperature gets dangerously high; the signal from the thermocouple relay can only exert a negative influence on the control system and only the signal from the sampler can open the feed line valve or turn on the heater.

Various concentrations of the product were tried, but it was determined that the preferred makeup of the product is approximately 1.3 M in aluminum and 0.5 M in nitric acid, with the concentration of uranium, fission and transmutation products being what follows when the other two values are established. This may appear somewhat paradoxical since the latter class of materials have greater economic value than the acid and aluminum, but acid and aluminum concentrations are both easier to monitor in the sampler system for the particular dissolution concerned, and therefore make better criteria for controlling the dissolver than uranium and the products mentioned; however, the principles of the invention can be practiced equally well if some other components of the liquid in the dissolver are made the basis of the sampling system. Inasmuch as this is well known in the art no further mention will be made of it; monitoring on the basis of acidity and aluminum concentration is my preferred method.

In operation the dissolver just described produces a steady yield of uniform solution of 1.3 M aluminum and 0.5 M nitric acid during the entire dissolution cycle.

It will be understood that this invention is not to be limited to the details given herein but that it may be modified within the scope of the appended claims.

What is claimed is:

1. A dissolver for a solid mass comprising an approximately vertical reaction vessel, means for introducing the mass into the vessel, a solid, approximately horizontal liquid permeable supporting means for the mass adjacent the bottom of the reaction vessel, means for permitting vapor and entrained liquid to escape from the top of the reaction vessel, stripping means for stripping the entrained liquid from the vapor, means for condensing the vapor to condensate, and liquid-return means placed to receive the liquid so stripped and the condensate and lead the same directly to a junction with the reaction vessel below the said supporting means, the said liquid-return means being of uniform cross section and parallel with the reaction vessel throughout a major portion of its length.

2. The dissolver of claim 1 where the supporting means is a horizontal perforated plate, the stripping means is a tubular upper turn of upward bow shape, and the liquid-return means is a straightaway tube external to the reaction vessel, parallel with it throughout a major portion of its length and communicating with the reaction vessel below the perforated plate.

3. The dissolver of claim 1 where the supporting means is a horizontal perforated plate, and the liquid-return means is a vessel of greater diameter and length than the reaction vessel coaxially surrounding it and in communication therewith at both ends.

References Cited in the file of this patent

UNITED STATES PATENTS 2,660,518  White _____ Nov. 24, 1953